United States Patent [19]

Speca

[11] Patent Number: 4,981,826

[45] Date of Patent: Jan. 1, 1991

[54] POLYMERIZATION CATALYST PREPARED WITH A HALOGENATED SILANE COMPOUND

[75] Inventor: Anthony N. Speca, Kingwood, Tex.

[73] Assignee: Exxon Chemical Patents Inc., Linden, N.J.

[21] Appl. No.: 438,905

[22] Filed: Nov. 17, 1989

[51] Int. Cl.$^5$ .................... C08F 4/616; C08F 4/656
[52] U.S. Cl. .................... 502/116; 502/112; 502/115; 502/117; 502/119; 502/120; 502/125; 526/124; 526/125
[58] Field of Search ............... 502/112, 115, 116, 117, 502/119, 120, 125

[56] References Cited

U.S. PATENT DOCUMENTS

| | | | |
|---|---|---|---|
| 3,513,150 | 5/1970 | Matsuura et al. | 250/94.9 |
| 4,004,071 | 1/1977 | Aisitima et al. | 526/116 |
| 4,136,058 | 1/1979 | Harris et al. | 252/429 B |
| 4,248,735 | 2/1981 | McDaniel et al. | 252/428 |
| 4,250,288 | 2/1981 | Lowery et al. | 526/157 |
| 4,263,171 | 4/1981 | Shida et al. | 252/429 C |
| 4,267,292 | 5/1981 | Benton et al. | 526/79 |
| 4,276,191 | 6/1981 | Karayannis et al. | 252/429 C |
| 4,301,029 | 11/1981 | Caunt et al. | 252/429 B |
| 4,302,565 | 11/1981 | Goeke et al. | 526/88 |
| 4,302,566 | 11/1981 | Karol et al. | 526/125 |
| 4,378,304 | 3/1983 | Dombro | 252/429 B |
| 4,385,161 | 5/1983 | Caunt et al. | 526/114 |
| 4,388,220 | 6/1983 | Hartshorn | 252/429 B |
| 4,402,861 | 9/1983 | Hoff | 252/429 B |
| 4,451,574 | 5/1984 | Johnson | 502/115 |
| 4,564,606 | 1/1986 | Best | 502/117 |
| 4,565,797 | 1/1986 | Etherton | 502/116 |
| 4,713,547 | 12/1987 | Grossman | 250/373 |

FOREIGN PATENT DOCUMENTS

| | | |
|---|---|---|
| 32308 | 7/1981 | European Pat. Off. . |
| 56-098206 | 8/1981 | Japan . |
| 64-010528 | 2/1989 | Japan . |
| 2101610 | 1/1983 | United Kingdom . |

*Primary Examiner*—Patrick P. Garvin
*Attorney, Agent, or Firm*—J. F. Hunt; T. D. Simmons

[57] ABSTRACT

Described is a magnesium-transition metal containing catalyst component, comprising a solid reaction product obtained by treating a solid support material in an inert solvent in any order with (A) a halogenated silane compound, (B) an alkoxy-containing magnesium compound, (C) and acyl halide, (D) at least one transition metal compound of a Group IVb-VIb or VIII metal, and optionally (E) treating the magnesium-transition metal containing product with an organometallic compound of a Group IIa, IIb, or IIIa metal. The magnesium-transition metal containing catalyst component, when employed with known Ziegler cocatalyst, provides a catalyst system which have very high catalytic activities for production of polyolefin of high bulk density. The polymerization kinetics of the catalyst system is controllable as a function of the reagent molar ratios selected for production of the magnesium-transition metal containing catalyst component.

26 Claims, No Drawings

POLYMERIZATION CATALYST PREPARED WITH A HALOGENATED SILANE COMPOUND

BACKGROUND OF THE INVENTION

1. Field of the Invention

This invention relates to novel supported catalysts for the polymerization of olefins to polyolefins such as polyethylene, polypropylene and the like, or copolymers such as ethylene copolymers with other alpha-olefins and diolefins. This invention especially relates to the use of halogenated silane compounds, preferably tetra- and trichlorosilanes, in place of chlorine gas and other chlorine-containing compounds as a chlorinating agent for the production of a magnesium-transition metal containing catalyst component of enhanced activity and capable of producing polyolefins in particle form of high bulk density. The use of a chlorinated silane compound as a chlorinating agent during formation of magnesium-titanium catalyst component imparts unusually high activity and improved hydrogen response to a catalyst system and the polymer product obtained has a desirable bulk density compared to a catalyst system using an otherwise similarly prepared catalyst component wherein chlorine gas or other non-silane type of chlorine compounds are used as a chlorinating agent. The improved catalyst components and catalyst systems using such components are especially useful for the production of linear polyethylenes such as high density and linear low density polyethylene. The polymer product produced with such catalyst system has an important balance of polymer properties. For example, the catalyst system produces a polymer with a narrow molecular weight distribution, in particle form of high bulk density, and with a narrow size distribution of spherical particles. In addition, the resins exhibit excellent melt strength during processing resulting in excellent bubble stability during film blowing.

2. Description of the Prior Art

Recently, interest has arisen in the use of magnesium-titanium complex catalyst components for the polymerization of olefins. For example, catalyst components comprising the reaction product of an aluminum alkymagnesium alkyl complex plus titanium halide are disclosed in U.S. Pat. Nos. 4,004,071 and 4,276,191. Each of U.S. Pat. Nos. 4,402,861, 4,378,304, 4,388,220, 4,301,029 and 4,385,161 disclose supported catalyst systems comprising an oxide support; such as silica; an organomagnesium compound, a transition metal compound and one or more catalyst component modifiers. European patent application No. 27733 discloses a catalyst component produced by reducing a transition metal compound with an excess of organomagnesium compound in the presence of a support such as silica and thereafter deactivating the excess organomagnesium compound with certain deactivators including hydrogen chloride.

U.S. Pat. No. 4,136,058 discloses a catalyst component comprising an organomagnesium compound and a transition metal halide compound, which catalyst component is thereafter activated with an activating agent such as hydrogen chloride. This patent does not teach the use of support material such as silica, but otherwise the disclosure is similar to the above-discussed European patent application.

U.S. Pat. No. 4,250,288 discloses a catalyst which is the reaction product of a transition metal compound, an organomagnesium component, and an active non-metallic halide such as HCl and organic halides containing a labile halogen. The catalyst reaction product also contains some aluminum alkyls.

U.S. Pat. Nos. 4,713,547 and 4,263,171, respectively disclose a catalyst component comprising silica, an aluminum-type titanium trichloride and dibutyl magnesium and a catalyst component comprising a magnesium alkyl-aluminum alkyl complex plus titanium halide on a silica support.

The use of chlorine gas in polymerization processes is taught in U.S. Pat. No. 4,267,292 wherein it is disclosed that chlorine gas is to be added to the polymerization reactor after polymerization has been initiated in the presence of a Ziegler catalyst. U.S. Pat. No. 4,248,735 teaches subjecting a silica support to a treatment with bromine or iodine and thereafter incorporating a chromium compound onto the support. U.S. Pat. No. 3,513,150 discloses the treatment of gamma alumina plus titanium tetrachloride with a gaseous chlorinating agent and employing said treated material in combination with a cocatalyst for the polymerization of ethylene.

European patent application No. 32,308 discloses polymerizing ethylene in the presence of a catalyst system comprising an organic metal compound and a titanium-containing material which is obtained by reacting together an inert particulate material, an organic magnesium compound, a titanium compound and a halogen-containing compound such as $SiCl_4$, $PCl_3$, $BCl_3$, $Cl_2$ and the like.

British No. 2,101,610, discloses the treatment of silica with a magnesium alkyl, an alcohol, benzoyl chloride and $TiCl_4$. In each of Japanese Kokai Nos. 56-098206 and 57-070107 acyl halides are employed during the preparation of titanium supported catalysts.

The catalyst systems comprising magnesium alkyls and titanium compounds, although generally useful for the polymerization of olefins such as ethylene and other 1-olefins, do not show excellent responsiveness to hydrogen during the polymerization reaction for the control of molecular weight, do not readily incorporate comonomers such as butene-1 for the production of ethylene copolymers, and do not show an extremely high catalytic activity.

In U.S. Pat. No. 4,451,574, a catalyst system obtained by treating an inert particulate support, such as silica, with an organometallic compound, a titanium halide and a halogen gas is disclosed. Although the catalyst obtains very high activities, there is a need for improving the properties of polymer product obtained by polymerizing olefins in the presence of the catalyst and to improve the bulk density of polymer product.

In U.S. Pat. No. 4,564,606 there is disclosed a transition metal supported catalyst component obtained by contacting an inert solid support with (a) the reaction product of a dialkyl magnesium compound and an alcohol, (b) an acyl halide, (c) $TiCl_4$, and (d) $Cl_2$. In U.S. Pat. No. 4,565,797 there is disclosed a transition metal supported catalyst component obtained by contacting an inert solid support with (a) the reaction product of a dialkyl magnesium compound and an oxygen-containing compound, (b) a transition metal halide such as $TiCl_4$, (c) $Cl_2$ and treating the resulting solid with an organometallic compound of a Group IIa, IIb or IIIa metal. Although these catalysts obtain high activities and improved resin properties, there is a need for improving both activity and response to hydrogen.

SUMMARY OF THE INVENTION

In accordance with this invention improved catalysts have been found which have very high catalytic activities and excellent hydrogen responsiveness for the control of molecular weight, excellent comonomer response and obtain polymer product with improved properties. The resins exhibit excellent melt strength at low extrusion power consumption, resulting in excellent bubble stability in blown film production at high extrusion rates. The invention is an improvement over U.S. Pat. No. 4,565,797 in that the catalysts of this invention obtain an improvement in catalytic activity and hydrogen response providing polymers with reduced ash content and a broad range of molecular weights. In addition, the catalysts provide control over polymerization kinetics by judicious choice of reagent molar ratios. In all cases polymers of high bulk density are produced at high activity in comparison to catalysts described previously. These improvements are obtained utilizing a chlorinated silane compound as a chlorinating agent rather than chlorine gas during production of the catalyst component.

In accordance with the objectives of this invention there is provided a magnesium-transition metal containing catalyst component for use in a catalyst system for the polymerization of alpha-olefins. The catalyst component of this invention comprises a solid reaction product obtained by treating a thermally dehydrated solid support material in an inert solvent with (A) a halogenated silane compound, preferably trichlorosilane and (B) an alkoxy-containing magnesium compound to yield a solid supported material which is then treated in an inert solvent with (C) an acyl halide, (D) at least one transition metal compound of a Group IVb, Vb, VIb, or VIII metal of the Periodic Table, and optionally (E) treating the magnesium-transition metal containing product with an organometallic compound of a Group IIa, IIb, or IIIa metal. Upon completion of the reaction, the inert solvents may be removed to yield the catalyst component as a free-flowing powder. The use of a highly chlorinated silane compound as a chlorinating agent in replacement of chlorine gas or non-silane types of chlorine containing compounds provides an improved catalyst component, which when used with an aluminum alkyl cocatalyst, produces the improved catalyst system of this invention which can be usefully employed for the polymerization of olefins.

The solid magnesium-transition metal containing catalyst component when employed in combination with a cocatalyst such as an alkyl aluminum cocatalyst provides a catalyst system which demonstrates a number of unique properties that are of great importance in olefin polymerization technology such as, for example, extremely high catalytic activity, bulk density, improved comonomer response, and increased polymer yield. A particular advantage of the instant invention is the ability to control the molecular weight during the polymerization reaction as a result of the improved responsiveness to hydrogen.

In a preferred embodiment of the invention the solid support is a silica gel which has been dehydrated to remove all absorbed water and part of the surface hydroxyl groups. This is accomplished by heating the silica to a temperature of from about 300° to about 800° C.; the highly halogenated silane compound is of the formula $R_y Si_n X_{2n+2-y}$ wherein R is nycrogen or an alkyl group X is a halogen, "n" is 1, 2, 3 or 5 and "y" is 0 to 2n; the alkoxy magnesium compound of the catalyst precursor composition is represented by the formula $R^1{}_z MgOR^2{}_{2-z}$ wherein $R^1$ and $R^2$ are the same or different alkyl, aryl, cycloalkyl, aralkyl, alkadienyl groups having from 1 to 20 carbon atoms and "z" is a real number equal to or greater than zero and less than 2, preferably less than one; and the acyl halide is represented by the formula $R^3 COX^1$ wherein $R^3$ can be a $C_1$ to $C_{20}$ alkyl group, cycloalkyl group or aryl group and X' is halogen. The transition metal compound is preferably a compound or combination of transition metal compounds represented by the formulas $MX''_{4-q}(OR^4)_q$, $MX''_{4-q}R^4 q$, $VOCOR^4 V_3$ and $VOX''_3$, wherein M is a transition metal of Groups IVb, Vb, VIb, and VIII and preferably titanium, vanadium or zirconium, $R^4$ is an alkyl group, aryl group, aralkyl group or substituted aralkyl group having from 1 to 20 carbon atoms and 1,3-cyclopentadienyl, X" is halogen and q is zero or a number less than or equal to 4; the organometallic compound is an aluminum alkyl represented by $R^5{}_m AlX''''_{3-m}$ wherein X''' is a halogen or hydride and $R^5$ is a hydrocarbon group selected from alkyl group, aryl group, cycloalkyl group, aralkyl group, alkadienyl group or alkenyl group having from 1 to 20 carbon atoms and $1 <= m <= 3$.

All references to the Periodic Table are to the Periodic Table of the Elements printed on page B-3 of the 56th Edition of Handbook of Chemistry and Physics. CRC Press (1975).

The drying of the solid reaction product to a free-flowing powder can be accomplished for example, by removing the supernatant liquid in vacuo or under a sweep of dry, inert gas, such as nitrogen or argon. The drying temperature covers a broad range but preferably is high enough to efficiently remove the hydrocarbon diluent. The resulting product is a dry, free flowing solid wherein magnesium and transition metal compounds are reacted on the inert solid support material.

In a second embodiment of this invention there is provided a catalyst system comprising the magnesium-transition metal containing solid catalyst component and an organoaluminum cocatalyst for the polymerization of alpha-olefins using the catalyst of this invention under conditions characteristic of Ziegler polymerization. The catalyst system can be employed in slurry, single-phase melt, solution or gas-phase polymerization processes and is particularly effective for the gas phase production of linear polyethylenes such as high density polyethylene and linear low density polyethylene. The catalyst system comprising the transition metal-containing catalyst component and an organoaluminum cocatalyst is advantageously employed in a gas phase ethylene polymerization process since there is a decrease in reactor fouling as generally compared with catalytic prior art ethylene gas phase polymerization processes thereby resulting in less frequent reactor shut downs for cleaning purposes.

In view of the high activity of the catalyst system prepared in accordance with this invention as compared with conventional Eiegler catalysts, it is generally not necessary to deash the polymer product since it will generally contain lower amounts of catalyst residues than polymer product produced in the presence of conventional catalysts.

The catalyst system is usefully employed in the homopolymerization of ethylene and alpha-olefins having from 3 or more carbon atoms, particularly alpha-olefins having from 3 to 8 carbon atoms, and co-polymerization of ethylene with other 1-olefins or diolefins having from 2 to 20 carbon atoms, such as propylene, butene, pentene, hexene, butadiene, 1,4-pentadiene and the like, so as to form ethylene copolymers of low and medium densities. The supported catalyst system is particularly useful for the polymerization of ethylene and copolymerization of ethylene with other alpha-olefins in gas phase processes.

DESCRIPTION OF THE PREFERRED EMBODIMENTS

Briefly, the magnesium-transition metal containing catalyst component of the present invention comprises the solid reaction product obtained by contacting a solid dehydrated support material (A) in a hydrocarbon solvent with a halogenated silane compound, preferably trichlorosilane (B), an alkoxy magnesium compound (C), and acyl halide (D), at least one transition metal compound (E) and optionally treated with an organometallic compound of a Group IIa, IIb, IIIa metal (F).

The catalyst component forming ingredients can be added in any order to the dehydrated support material (with the exception of the organometallic compound (F) which must be last) in preparing the magnesium-transition metal containing catalyst component. At equivalent mmol reagent per g. silica loadings, catalyst components of the highest activity and hydrogen response are obtained wherein the solid support material is contacted with the acyl halide prior to the halogenated silane compound.

The magnesium-transition metal containing catalyst component may be prepared by first treating the inert dehydrated solid support material with trichlorosilane followed by addition of an alkyl magnesium alkoxide to form an intermediate product which is then treated with the acyl halide and at least one transition metal compound, and then prereducing this product with an organometallic compound of a Group IIIa metal. Especially preferred sequences for preparing the magnesium-transition metal containing catalyst component are those wherein the addition of the acyl halide precedes the halogenated silane compound and the alkyl magnesium alkoxide precedes the acyl halide.

Typically, the support can be any of the solid particulate porous supports such as a Group IIa, IIIa, IVa or IVb metal oxide in finely divided form. The metal oxides of the IIIa and IVa metals are the most preferred supports.

Suitable inorganic oxide materials which are desirably employed in accordance with this invention include silica, alumina, and silica-alumina and mixtures thereof. Amorphous silica is especially preferred. Other inorganic oxides that may be employed either alone or in combination with silica, alumina or silica-alumina are magnesia, titania, zirconia, and the like. Other suitable support materials, however, can be employed, for example, finely divided polyolefins such as finely divided polyethylene.

The metal oxides, and particularly silica gel, generally contain absorbed water and acidic surface hydroxyl groups which will react with the metallic compositions or other water reactive components with which it is first contacted. Prior to use, an inorganic oxide support must first be thermally dehydrated, i.e., subjected to a thermal treatment in order to remove any free water and to reduce the concentration of the surface hydroxyl groups. The thermal dehydration treatment of the inorganic oxide support is carried out in vacuum or while purging with a dry inert gas such as nitrogen at a final temperature of about 100° to about 1000° C., and preferably from 300° C. to about 800° C. Pressure considerations are not critical. The duration of the thermal treatment of the support material can be from about 1 to about 24 hours. However, shorter or longer times can be employed provided equilibrium is established with the surface hydroxyl groups. The thermal dehydration treatment should be continued until the content of surface hydroxyl groups measured as the water content of the support material is reduced to not more than 2 wt %, and preferably in the range of 1 wt %.

The halogenated silane compound used in preparing catalyst components of this invention is of the formula:

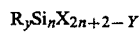

$$R_y Si_n X_{2n+2-Y}$$

wherein each R is independently hydrogen, a straight, branched or cyclic alkyl groups, aryl, aralkyl, alkadienyl or alkenyl groups containing from 1 to about 20 carbon atoms, and preferably from 1 to about 20 carbon atoms; each X is independently F, Cl, Br or I; "n" is 1, 2, 3 or 5 and "y" is a number from 0 to 2n. Preferably R is hydrogen or methyl, most preferably hydrogen, X is chlorine, "n" is 1 and "y" is 0 or 1.

Exemplary of the halogenated silicon compounds which may be usefully employed in practice of this invention are the tetra(monohalo)silanes (n=1, y=0) such as tetrachlorosilane and tetrabromosilane; the tetra(mixed halo) silanes (n=1, y=0) such as bromotrichlorosilane, dibromodichlorosilane, tribromochlorosilane, chlorotriiodiosilane, dichlorodiiodosilane, trichloroiodosilane, tribromofluorosilane, trichlorofluorosilane, bromodichlorofluorosilane and dibromochlorofluorosilane; the trihalosilanes (y=1, R=H) such as trichlorosilane and tribromosilane; the dichlorosilanes (y=2, R=H, n=1) such as dibromosilane; the halogenated polysilanes (n=2, 3 or 5 and y=0) such as hexachlorodisilane [Si$_2$Cl$_6$], octachlorotrisilane [Si$_3$Cl$_8$] and dodecachloropentasilane [Si$_5$Cl$_{12}$]; and the organohalosilanes (Y≧1) such a dimethylchlorosilane and the like.

The halogenated silane compounds most preferred for use are the tetrahalo silanes, particularly tetrachlorosilane, and the trihalosilanes, particularly trichlorosilane.

The alkoxy magnesium compounds used in preparing the catalyst components of this invention are represented by the formula $R^1_z MgOR^2_{2-z}$ wherein each of $R^1$ and $R^2$ hydrocarbyl groups which may be the same or different and are alkyl, aryl, cycloalkyl, aralkyl, alkadienyl, or alkenyl groups, and "z" is a real number equal to or greater than zero and less than 2, preferably less than 1. The hydrocarbyl groups R and Rz can contain between 1 and 20 carbon atoms and preferably from 1 to about 10 carbon atoms.

The alkoxy magnesium compounds may be separately prepared as the product of reaction between an organomagnesium compound of the formula $R^1 MgR''$ wherein each of $R^1$ and $R''$ are the same or different hydrocarbyl groups with an oxygen-containing compound such as an alcohol, aldehyde, siloxane or ketone.

Alternatively, though less preferred, the alkoxy magnesium compound can be prepared in situ during preparation of the catalyst component by contacting the solid support while in a hydrocarbon solvent with the organomagnesium compound and the oxygen-containing compound in any order of addition or simultaneously.

Illustrative but non-limiting examples of magnesium compounds which may be suitably employed in preparing the alkoxy magnesium compound are diethylmagnesium dipropylmagnesium, di-isopropylmagnesium, di-n-butylmagnesium, di-isobutylmagnesium, dimylmagnesium, di-n-octylmagnesium, di-n-hexylmagnesium; di-n-decylmagnesium, and di-n-dodecylmagnesium; dicycloalkylmagnesiums, such as dicyclohexylmagnesium; diarylmagnesiums such as dibenzylmagnesium, ditolylmagnesium and dixylylmagnesium and the like.

Preferably the organomagnesium compounds will have from 1 to 6 carbon atoms and most preferably $R^1$ and $R''$ are different. Illustrative examples of the preferred magnesium compounds are ethyl-n-propylmagnesium, ethyl-n-butylmagnesium, amyl-n-hexylmagnesium, n-butyl-s-butylmagnesium, n-butyl-n-octylmagnesium, and the like. Mixtures of hydrocarbyl magnesium compounds may be suitably employed such as for example di-n-butylmagnesium and ethyl-n-butyl-magnesium.

The magnesium hydrocarbyl compounds are generally obtained from commercial sources as mixtures with a minor amount of aluminum hydrocarbyl compound. The minor amount of aluminum hydrocarbyl is present to facilitate solubilization and/or reduce the viscosity of the organomagnesium compound in a hydrocarbon solvent.

The hydrocarbon solvent usefully employed for the organomagnesium can be any of the well known hydrocarbon liquids, for example hexane, heptane, octane, decane, dodecane, or mixtures thereof, as well as aromatic hydrocargons such as benzene, toluene, xylene, etc.

The organomagnesium complex with a minor amount of aluminum alkyl can be represented by the formula $(R^1MgR'')_p(R'_3Al)_s$ wherein $R^1$ and $R''$ are as defined above, $R'$ is as $R^1$ and $R''$ are defined above, and p is greater than 0. The ratio of $s/s+p$ is from 0 to 1, preferably from 0 to about 0.7 and most desirably from about 0 to 0.1.

Illustrative examples of the organomagnesium organoaluminum complexes are

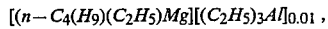

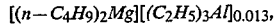

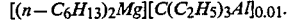

A suitable magnesium-aluminum complex is Magala ® BEM manufactured by Texas Alkyl, Inc.

The hydrocarbon soluble organometallic compositions are known materials and can be prepared by conventional methods. One such method involves, for example, the addition of an appropriate aluminum alkyl to a solid dialkyl magnesium in the presence of an inert hydrocarbon solvent. The organomagnesium-organoaluminum complexes are, for example, described in U.S. Pat. Nos. 3,737,393 and 4,004,071, which are incorporated herein by reference. However, any other suitable method for preparation of organometallic compounds can be suitably employed.

Whether separately prepared and used, or whether prepared in situ during preparation of a catalyst component, the alkoxy magnesium compound is preferably one prepared by reacting a dialkylmagnesium compound with an alcohol as the oxygen-containing compound. Preferably the oxygen-containing compounds are selected from alcohols represented by the formulas $R^2OH$ wherein $R^2$ can be alkyl groups, aryl groups, cycloalkyl groups, aralkyl groups, alkadienyl groups, or alkenyl groups having from 2 to 20 carbon atoms. Preferably the Rz groups will have from 2 to 10 carbon atoms.

Illustrative, but non-limiting examples of alcohols, which may be usefully employed in accordance with this invention are alkyl alcohols such as ethanol, 1-propanol, 2-propanol, 1-butanol, 2-butanol, t-butanol, 1-pentanol, 2-pentanol, 3-pentanol, 1-hexanol, 2-ethyl-1-hexanol, 1-octanol, 1-decanol; cycloalkyl alcohols such as cyclobutanol, cyclohexanol; aryl alcohols, such as phenol, 1-naphthol, 2-naphthol; aralkyl alcohols such as benzylalcohol, p-cresol, m-cresol; alkenyl alcohols such as allylalcohol, crotylalcohol, 3-butene-1-ol; and alkadienyl alcohols such as 2,4-hexadiene-1-ol. The most preferred alcohol is butanol.

The preferred acyl halides can be represented by the formula $R^3COX'$ wherein $R^3$ is hydrocarbyl group containing 1 to 20 carbon atoms. $R^3$ can be an alkyl group, aryl group, aralkyl group, cycloalkyl group, alkadienyl group or alkenyl group and $X'$ is a halogen. The preferred halogen is chlorine More preferrably $R^3$ is an alkyl group having 1 to 6 carbon atoms or a phenyl or alkyl phenyl group having 6 to 10 carbon atoms. Most preferably $R^3$ is a methyl or phenyl group and $X'$ is chlorine.

Illustrative, but non-limiting, examples of the acyl halides which can be usefully employed in accordance with the invention are, alkyl acyl halides such as acetylchloride, propanoylchloride, butyrylchloride, butyrylbromide, isobutyrylchloride, aryl acyl halides such as benzoylchloride, 1-naphthoylchloride, 2-naphthoylchloride; cycloalkyl acyl halides such as cyclopentane carbonylchloride, cyclohexane carbonylchloride, aralkyl acyl halides such as p-toluoylchloride, m-toluoylchloride; alkenyl acyl halides suchas acryloylchloride 6-heptenoylchloride, crotonoylchlorides. Acid chlorides based on polyacids may also usefully be employed such as, for example, dodecanedioyl, succinyl chloride, camphoryl chloride, terephthaloyl chloride and the like. The most preferred acid halide is benzoyl chloride.

The transition metal compounds of a Group IVb, Vb, VIb or VIII metal which can be usefully employed in the preparation of the transition metal-containing catalyst component of this invention are well know in the art. The transition metals which can be employed in accordance with this invention may be represented by the formulas $MX''_{4-q}(OR^4)_q$, $MX''_{4-q}R^4_q$, $VOX''_3$ and $VO(OR^4)_3$. M is a Group IVb, Vb, VIb, and VIII metal, preferably a Group IVb or Vb metal and most preferably titanium, vanadium or zirconium, q is 0 or a number equal to or less than 4, $X''$ is halogen and $R^4$ is an alkyl, aryl, aralkyl, substituted aralky, or 1,3-cyclopentadienyl group of from 1 to 20 carbon atoms and the like. The aryl, aralkyls and substituted aralkyls preferably contain from 1 to 10 carbon atoms. When the transition metal compound contains a hydrocarbyl group, R<, being an alkyl, cycloalkyl, aryl, or aralkyl group, the hydrocarbyl group will preferably not contain a hydrogen atom in position beta to the metal-carbon bond. Illustrative, but nonlimiting, limiting, examples of alkyl groups are methyl, neo-pentyl, 2,2-dimethylbutyl, 2,2-dimethylhexyl; aryl groups such as phenyl, naphthyl, aralkyl groups such as benzyl; cycloalkyl groups such as 1-norbornyl. Mixtures of the transition metal compounds can be employed if desired.

Illustrative examples of the transition metal compounds include $TiCl_4$, $TiBr_4$, $Ti(OC_2H_5)_3Cl$, $Ti(OC_4H_5)Cl_3$, $TI(OC_4H_9)_3Cl$, $TI(OC_3H_7)_2Cl_2$, $Ti(OC_6H_{13})_2Cl_2$, $Ti(OC_8H_{17})_2Br_2$, and $Ti(OC_{12}H_{25})Cl_3$. $TiCl_4$ is preferred.

As indicated above, mixtures of the transition metal compounds may be usefully employed, no restriction being imposed on the number of transition metal compounds which may be reacted with the organometallic composition. Any halogenide and alkoxide transition metal compound or mixtures thereof can be usefully employed. The titanium tetrahalides are especially preferred with titanium tetrachloride being most preferred.

The magnesium-transition metal containing catalyst solid may optionally be treated with an organometallic compound of a Group IIa, IIb or IIIa metal. Preferably the organometallic compound (F) employed in the treatment step is an aluminum alkyl represented by the structural formula $r_m{}^5AlX'''_{3-m}$ wherein $X''''$ is halogen or hydride and $R^5$ is a hydrocarbyl group selected from $C_1$ to $C_{18}$ saturated hydrocarbon radicals and m' is equal to or greater than 1 and less than or equal to 3.

Illustrative of such compounds which can usefully be employed in the treatment step of this invention are $Al(C_2H_5)_3$, $Al(C_2H_5)_2Cl$, $Al(i-C_4H_9)$, $Al(C_2H_5)_3Cl_3$, $Al(i-C_4H_9)_2H$, $Al(C_6H_{13})_3$, $Al(C_8H_{17})_3$, $Al(C_2H_5)_2H$. Preferably the organoaluminum compound is an aluminum trialkyl where the alkyl groups can have from 1 to 10 carbon atoms and most preferably from 2 to 8 carbon atoms. Tri-n-hexylaluminum and tri-n-octylaluminum being most preferred.

The treatment of the dehydrated support material as mentioned above is conducted in an inert solvent. The inert solvents can also be usefully employed to dissolve the individual ingredients prior to the treatment step. Preferred solvents include mineral oils and the various hydrocarbons which are liquid at reaction temperatures and in which the individual ingredients are soluble. Illustrative examples of useful solvents include the alkanes such as pentane, isopentane, hexane, heptane, octane and nonane; cycloalkanes such as cyclopentane and cyclohexane; and aromatics such as benzene, toluene, ethylbenzene and xylenes. The amount of solvent to be employed is not critical. Nevertheless, the amount should be employed so as to provide adequate heat transfer away from the catalyst components during reaction and to permit good mixing.

The amount of materials usefully employed in the solid catalyst component can vary over a wide range. The concentration of magnesium deposited on the thermally treated support can be in the range from about 0.1 to about 5.0 millimoles/g of support, however, greater or lesser amounts can be usefully employed. Preferably, the magnesium concentration is in the range of 0.5 to 3.0 millimoles/g of support and especially 1.0 to 2.5 millimoles/g of support. Wherein the alkoxymagnesium compound is produced in situ during preparation of the catalyst component, the organomagnesium to oxygen-containing compound mole ratio can range from about 0.01 to about 2.0. Preferably, the ratio is in the range 0.5 to 1.5, and more preferably in the range 0.8 to 1.2. The upper limit on this range is dependent on the choice of oxygen containing compound and the mode of addition. When the oxygen containing compound is not premixed with the magnesium compound, that is, when it is added to the support before the magnesium compound or after the magnesium compound, the ratio may range from 0.01 to 2.0. When pre-mixed with the organomagnesium compound, the hydrocarbyl groups on the oxygen containing compound must be sufficiently large to ensure solubility of the reaction product, otherwise the ratio of oxygen containing compound to organomagnesium compound ranges from 0.01 to 1.0, most preferably 0.8 to 1.0.

The halogenated silane compound is added to the support to provide a mole ratio of about 0.1 to about 10 and most preferably 0.5 to about 2.0 with respect to the magnesium compound.

The amount of acyl halide employed should be such as to provide a mole ratio of about 0.1 to about 10 and most preferably 0.5 to about 2.0 with respect to the magnesium compound.

The transition metal compound is added to the inert support at a concentration of about 0.01 to about 1.5 mmoles Ti/g of dried support, preferably in the range of about 0.05 to about 1.0 mmoles Ti/g of dried support and especially in the range of about 0.1 to 0.8 mmoles Ti/g of dried support.

The optional treatment of the solids with the Group IIa, IIb or IIIa metal alkyl can be accomplished, for example, by either adding the Group IIa, IIb or IIIa metal alkyl to the solid mixture or by slurrying the dried solid mixture in an inert solvent followed by the appropriate quantity of the organometallic treating agent. The amount of metal alkyl treating agent to be employed should be such as to provide a mole ratio of about 0.5 to about 50 and preferably 1 to about 20 with respect to titanium. Most preferably the mole ratio will be from about 1 to about 4.

Generally, the individual reaction steps can be conducted at temperatures in the range of about $-50°$ C. to about 150° C. Preferred temperature ranges are from about $-30°$ C. to about 60° C. with $-10°$ C. to about 50° C. being most preferred. The reaction time for the individual treatment steps can range from about 5 minutes to about 24 hours. Preferably the reaction time will be from about fifteen minutes to about 8 hours. During the reaction constant agitation is desirable.

In the preparation of the magnesium-transition metal containing catalyst component drying after the completion of any step may be effected. Washing after the completion of any step may also be effected. However, it is generally found that the material advantages of the catalyst system are diminished by washing until the completion of the metal alkyl treatment step.

The magnesium-transition metal catalyst component prepared in accordance with this invention are usefully employed with cocatalysts well known in the art of the Ziegler catalysis for polymerization of olefins. Typically, the cocatalysts which are used together with the transition metal-containing catalyst component are organometallic compounds of Group Ia, IIa, IIb, and IIIa metals such as aluminum alkyls, aluminum alkyl hydrides, lithium aluminum alkyls, zinc alkyls magnesium alkyls and the like. The cocatalysts desirably used are the organoaluminum compounds. The preferred alkylaluminum compounds are represented by the formula $AlR^6{}_{n'}X^*{}_{3-n'}$ wherein $1<=n'<=3$ and each $R^6$ is independently a hydrogen, hydrocarbyl or substituted hydrocarbyl group and $X^*$ is halogen. Preferably $R^6$ is an alkyl group having from 2 to 8 carbon atoms. Illustrative examples of the cocatalyst material are ethylaluminum dichloride, ethylaluminum sesquicyloride, diethylaluminum chloride, triethylaluminum, tri-n-butylaluminum, diisobutylaluminum hydride, diethylaluminum ethoxide and the like. Aluminum trialkyl compounds are most preferred with triisobutylaluminum and tri-n-hexylaluminum being highly desirable.

The catalyst system comprising the alkylaluminum cocatalyst and the magnesium-transition metal containing catalyst component is usefully employed for the polymerization of ethylene, other alpha-olefins having from 3 to 20 carbon atoms, such as for example, propylene, butene-1, pentene-1, hexene-1, 4-methylpentene-1, and the like and ethylene copolymers with other alpha-olefins or diolefins such as 1,4-pentadiene, 1,5-hexadiene, butadiene, 2-methyl-1,3-butadiene and the like. The polymerizable monomer of preference is ethylene. The catalyst may be usefully employed to produce high density polyethylene or linear low density polyethylene by copolymerizing ethylene with other alpha-olefins or diolefins, preferably propylene, butene-1, pentene-1, hexene-1, and octene-1. The olefins can be polymerized in the presence of the catalyst of this invention by any suitable known process such as, for example, suspension, solution and gas-phase polymerization processes.

The polymerization reaction employing catalytic amounts of the above-described catalyst can be carried out under conditions well known in the art of Ziegler polymerization, for example, in an inert diluent at a temperature in the range of 50° C. to 120° C. and a pressure of 1 and 40 atmospheres or in the gas phase at a temperature range of 70° C. to 100° C. at about 1 to about 50 atmospheres and upward. Illustrative of the gas-phase processes are those disclosed in U.S. Pat. No. 4,302,565 and U.S. Pat. No. 4,302,566 which references are hereby incorporated by reference. As indicated above, one advantageous property of the catalyst system of this invention is the reduced amount of gas phase reactor fouling. The catalyst system can also be used to polymerize olefin at single phase conditions, i.e., 150° C. to 320° C. and 1000-3000 atmospheres. At these conditions the catalyst lifetime is short but the activity sufficiently high that removal of catalyst residues from the polymer is unnecessary. However, it is preferred that the polymerization be done at pressures ranging from 1 to 50 atmospheres, preferably 5 to 25 atmospheres.

In the processes according to this invention it has been discovered that the catalyst system is highly responsive to hydrogen for the control of molecular weight. Other well known molecular weight controlling agents and modifying agents, however, may be usefully employed.

The polyolefins prepared in accordance with this invention can be extruded, mechanically melted, cast or molded as desired. They can be used for plates, sheets, films and a variety of other object.

While the invention is described in connection with the specific examples below, it is understood that these are only for illustrative purposes. Many alternatives, modifications and variations will be apparent to those skilled in the art in light of the below examples and such alternatives, modifications and variations fall within the general scope of the claims.

EXAMPLES

In each of the Examples and Comparative Examples described hereafter, the silica support used was first dehydrated by placing a microspheroidal silica gel in a vertical column and fluidizing with an upward flow of $N_2$. The column was heated slowly to the desired dehydration temperature with a three hour hold at 200° C. and a three hour hold at the final dehydration temperature of 500° C., after which the silica was cooled to ambient temperature. The surface hydroxyl group content, measured as a water content of the silica gel, following the thermal dehydration treatment was about 1.3 wt %.

In each of the Examples and Comparative Examples described hereafter, the alkyl magnesium alkoxide used was prepared as follows. To a dry, $N_2$ purged, 125 cc serum bottle containing a stir bar was charged 52.23 g (44.8 mmole Mg) of Butyl Ethyl Magala ® as supplied by Texas Alkyls. Under stirring and at room temperature an equimolar amount (4.1 cc) of 1-butanol, previously dried over molecular sieves and $N_2$ purged, was slowly added. As the alcohol was added a gelatinous mass formed which slowly dissolved to yield a water white, clear liquid. The liquid was stirred for a total of three hours.

The melt index (MI) and melt index ratio (MIR) were measured in accordance with ASTM test D1238 (Condition E). Resin bulk density was determined by allowing approximately 120 cc of resin to fall across a gap of 2.6 cm from the the bottom of a polyethylene funnel into a tared 100 cc plastic cylinder (2.6 cm in diameter by 19.0 cm high). Without agitating the sample, excess resin was removed so that the container was completely filled. The weight of the resin in the 100 cc cylinder was determined. The measurement was repeated three times and average value recorded.

PREPARATION OF CATALYSTS

The following examples illustrate the preparation of the catalysts.

Catalyst Examples 1–13

Each catalyst component was prepared by adding 2 grams of a microspheroidal silica gel having a pore volume of 1.7 cc/g, a surface area of 335 $m^2/g$ and previously dehydrated in flowing nitrogen was weighed into a dry, $N_2$ purged, 125 ml serum bottle and the bottle was capped and sealed. 20 cc of dry oxygen-free hexane was added by syringe and the mixture stirred to form a slurry. To the slurry was added a measured quantity of trichlorosilane. After 15 minutes of stirring, a measured quantity of alkyl magnesium butoxide (prepared by adding one molar equivalent of butanol per mole of Butyl Ethyl Magala ® as supplied by Texas Alkyls) was added at a desired loading of magnesium on the silica as reported in the tables as the number of millimoles of magnesium per gram of silica gel. After 15 minutes stirring, a measured quantity of benzoyl chloride was added to the slurry and the stirring continued for a further 15 minutes. Then, 0.8 millimoles of $TiCl_4$ was added and the stirring continued for 15 minutes prior to the addition of 1.2 millimoles of tri-n-hexylaluminum per gram of silica. The resulting slurry was dried in vacuo to yield a free-flowing catalyst solid.

Comparative Examples C1–C5

Following the same procedure by which catalyst components of Examples 1 to 13 were prepared, five catalyst component compositions were prepared for comparative purposes with the following changes of conditions.

The Comparative Example C1 catalyst component was prepared as indicated, with the exception that no trichlorosilane was utilized.

The Comparative Example C2 catalyst component was prepared by substituting for the trichlorosilane a 1 to 3 molar ratio of chlorine to nitrogen which was bubbled into the slurry at a flow rate of 50 cc/minute for 40 minutes followed by nitrogen for 15 minutes to flush the slurry of chlorine gas.

The Comparative Example C3 catalyst component was similarly prepared but benzoyl chloride was not used.

The Comparative Example C4 catalyst component was similarly prepared, but ethylbenzoate was substituted for the benzoyl chloride.

The Comparative Example C5 catalyst component was similarly prepared, but butylethylmagnesium was substituted for the alkyl magnesiumbutoxide and no benzoyl chloride was used.

EXAMPLES 14–16

Following the same procedure by which the catalyst component of Example 1 was prepared, three further catalyst compositions were prepared with the following changes of conditions.

The Example 14 catalyst component was prepared by adding trichlorosilane following the addition of $TiCl<$.

The Example 15 catalyst component was prepared by adding trichlorosilane following the addition of benzoyl chloride.

The Example 16 catalyst component was prepared by adding trichlorosilane following the addition of the alkylmagnesium butyloxide.

Comparative Examples C6–C8

Following the same procedure by which catalyst components of Example 1 was prepared, three further catalyst compositions were prepared for comparative purposes by substituting for the trichlorosilane a 1 to 3 molar ratio of chlorine to nitrogen which was bubbled into the slurry at a flow rate of 50 cc/minute for 40 minutes followed by nitrogen for 15 minutes to flush the slurry of chlorine gas.

The Comparative Example C6 catalyst component was prepared by adding the chlorine gas following the addition of $TiCl_4$.

The Comparative Example C7 catalyst component was prepared by adding the chlorine gas following the addition of benzoyl chloride.

The Comparative Example C8 catalyst component was prepared by adding the chlorine gas following the addition of the alkyl magnesium butyloxide.

EXAMPLE 17

2.0 g of a microspheroidal silica gel having a pore volume of 1.7 cc/g, a surface area of 335 m$^2$/g and previously dehydrated in flowing nitrogen was weighed into a dry, $N_2$ purged, 125 ml serum bottle and the bottle was capped and sealed. 20 cc of dry, oxygen-free hexane was added by syringe and the mixture stirred to form a slurry. To the slurry was added 1.0 mmoles of trichlorosilane. After 15 minutes of stirring, sufficient alkyl magnesium butoxide solution was added to load 1.5 mmoles Mg/g of silica. After 15 minutes stirring 1.0 mmoles of benzoyl chloride was added to the slurry and stirring continued for a further 15 minutes. Then 0.8 mmole of $TiCl_4$ was added and stirring continued for 15 minutes prior to the addition of 1.2 mmoles of tri-n-hexyl aluminum/g of silica. The resulting slurry was dried in vacuo to yield the free flowing catalyst solid.

EXAMPLE 18

A catalyst was prepared as described in Example 18 except that silicon tetrachloride was substituted for trichlorosilane at the same mmole loading.

EXAMPLE 19

A catalyst was prepared as described in Example 18 except that dimethyl dichlorosilane was substituted for trichlorosilane at the same mmole loading. Comparative Example C9

Following the procedure of Example 17 a catalyst composition was prepared except that t-butylchloride was used in place of trichlorosilane.

EXAMPLE 20

810 g of the dehydrated, microspheroidal silica was slurried in 3340 g of isopentane at 25° C. under a pressure of 5 psig in a two gallon mixer. The temperature was raised to 35° C. and stirring was continued for all subsequent additions. 54.8 g of trichlorosilane was added over 15 minutes. After 1.0 hour 1980 ml of an alkylmagnesium butoxide solution in hexane containing 0.015 g Mg per ml solution was added over 15 minutes and the slurry was stirred for 1 hours. 118.4 g of neat benzoyl chloride was added over 15 minutes followed by 1.0 hours of stirring and then the addition of 61.5 g of neat $TiCl_4$ over 15 minutes. After 1 0 hour 2081 ml of a solution of 20% (w/w) of tri-n-hexylaluminum in isopentane was added over 15 minutes followed by an additional 1.0 hour of stirring. The mixer jacket temperature was raised to 45° C. and the solvent was flashed off until a mud formed. The jacket temperature was further raised to 65° C. and the mud was dried to a free-flowing solid under a purge of nitrogen. 1188 g of catalyst was recovered. Analysis of the catalyst provided the following: 0.92% Ti, 2.03% Mg. 1.77% Al, and 7.62% Cl.

Comparative Example C10

753 g of the dehydrated, microspheroidal silica was slurried in 3340 g of isopentane at 25° C. under a pressure of 5 psig in a two gallon mixer. A 25 mole percent mixture of chlorine in nitrogen was sparged through the slurry under stirring. The pressure on the mixer was allowed to increase to 11 psig and any excess pressure was vented. When a total of 105 g of chlorine had been added, nitrogen was used to sparge the slurry for 15 minutes. To the resulting slurry was added 2440 cc of a hexane solution (0.015 g Mg/cc) of the reaction product of butyl ethyl magnesium and an equimolar quantity of 1-butanol After a 2 hour reaction time 256 1 g of benzoyl chloride was added and the slurry stirred for an additional 1 hour. Then 57.3 g of $TiCl_4$ was added and stirring continued for 1 hour before 1935 cc of tri-n-hexylaluminum in hexane was added to load 1.2 mmol Al/g of silica. The catalyst was dried as detailed above 1226 g of catalyst was recovered. Analysis of the catalyst provided the following: 1.15% Ti, 1.78% Mg, 2.53% Al, and 9.52% Cl.

POLYMERIZATION EXAMPLES

Each of the catalyst components of Examples 1 to 20 of the invention and each of the catalyst components of the Comparative Examples C1 to C10 were used to prepare an ethylene butene-1 copolymer product. A standard polymerization procedure was employed Polymerizations were conducted by adding 850 ml of hexane to a 1.8 liter polymerization reactor. 1.3 ml of 25% (w/w) triethyl aluminum in heptane was added to the polymerization reactor. The reaction vessel was pressurized with 88 millimoles of hydrogen and then heated to 85° C. 20 ml of butene-1 was pressurized into the reactor with sufficient ethylene to bring the total reactor pressure to 150 psig. The dried catalyst component was injected into the reactor and polymerization was allowed to proceed for 40 minutes. The polymerization was terminated by shutting off the ethylene flow and rapidly cooling the reactor to room temperature.

The polymerization with each of the catalyst components of Examples 1 to 20 and of Comparative Examples C1 to C10 is shown in Tables A to E.

TABLE A

| EXAMPLE NUMBER | REAGENTS (mmol/g SILICA)[1] | | | | | | CATALYST ACTIVITY[2] | MI (g/10 min) | MIR[3] | BULK DENSITY[4] |
|---|---|---|---|---|---|---|---|---|---|---|
| | TCS | AMB | BzOCl | $Cl_2$ | BEM | EB | | | | |
| C1 | — | 2.0 | 2.4 | — | — | — | 462 | 1.0 | — | 0.40 |
| C2 | — | 2.0 | 2.4 | Yes | — | — | 859 | 0.4 | 22.0 | 0.32 |
| 1 | 1.0 | 2.0 | 2.4 | — | — | — | 2656 | 1.5 | 26.8 | 0.38 |
| C3 | 1.0 | 2.0 | — | — | — | — | 795 | 2.5 | 25.9 | 0.39 |
| C4 | 1.0 | 2.0 | — | — | — | 0.75 | 1085 | 6.9 | 25.6 | 0.41 |
| C5 | 1.0 | — | — | — | 1.5 | — | 662 | 2.2 | — | 0.33 |
| 11 | 0.5 | 1.5 | 0.5 | — | — | — | 1784 | 7.0 | 28.7 | 0.42 |

[1]TCS = trichlorosilane; AMB = alkyl magnesium butoxide; BzOCl = benzoyl chloride; $Cl_2$ = chlorine gas; BEM = butyl ethyl magnesium; Eb = ethyl benzoate. All catalyst components were prepared by supporting the indicated reagents on dehydrated silica followed by addition of $TiCl_4$ to a loading of 0.4 mmol/g silica and then tri-n-hexyl aluminum to a loading of 1.2 mmol/g silica.
[2]Units of catalyst activity are gPE/g catalyst component.
[3]MIR is the ratio of HLMI to MI measured by ASTM D1238 (Condition E)
[4]Units of Bulk Density are cc/g.

TABLE B

| EXAMPLE NUMBER | REAGENTS (mmol/g SILICA)[1] | | | | | CATALYST ACTIVITY[2] | MI (g/10 min) | MIR[3] | BULK DENSITY[4] | RESIN DENSITY[5] |
|---|---|---|---|---|---|---|---|---|---|---|
| | TCS | AMB | BzOCl | $TiCl_4$ | TNHAL | | | | | |
| 2 | 1.5 | 2.0 | 2.0 | 0.4 | 1.2 | 3856 | 5.0 | 24.3 | 0.35 | 0.9450 |
| 3 | 1.0 | 1.5 | 1.5 | 0.4 | 1.2 | 3728 | 3.8 | 24.5 | 0.35 | 0.9442 |
| 4 | 1.5 | 2.0 | 1.0 | 0.4 | 1.2 | 3130 | 4.0 | 24.6 | 0.37 | 0.9446 |
| 5 | 1.0 | 2.0 | 1.0 | 0.4 | 1.2 | 3066 | — | — | 0.41 | — |
| 6 | 1.5 | 1.0 | 2.0 | 0.4 | 1.2 | 3052 | 2.7 | 24.8 | 0.36 | 0.9443 |
| 7 | 1.5 | 1.0 | 1.0 | 0.4 | 1.2 | 3022 | 3.0 | 23.9 | 0.35 | 0.9443 |
| 1 | 1.0 | 2.0 | 2.4 | 0.4 | 1.2 | 2656 | 1.5 | 26.8 | 0.38 | — |
| 8 | 0.5 | 1.0 | 2.0 | 0.4 | 1.2 | 2536 | 3.7 | 25.2 | 0.37 | 0.9449 |
| 9 | 0.5 | 1.0 | 1.0 | 0.4 | 1.2 | 2352 | 3.6 | 25.2 | 0.35 | 0.9440 |
| 10 | 0.5 | 1.5 | 1.0 | 0.4 | 1.2 | 1784 | — | — | 0.35 | 0.9440 |
| 11 | 0.5 | 1.5 | 0.5 | 0.4 | 1.2 | 1784 | 7.0 | 28.7 | 0.42 | — |
| 12 | 0.5 | 2.0 | 2.0 | 0.4 | 1.2 | 1036 | 2.1 | 25.8 | 0.40 | 0.9444 |
| 13 | 0.5 | 2.0 | 1.0 | 0.4 | 1.2 | 1022 | 1.6 | 23.3 | 0.40 | 0.9440 |

[1]See Footnote 1 of Table A: THNAL=tri-n-hexyl aluminum
[2]See Footnote 2 of Table A.
[3]See Footnote 3 of Table A.
[4]See Footnote 4 of Table A.
[5]Units of Resin Density are g/cc.

TABLE C

| EXAMPLE NUMBER | REAGENT SEQUENCE[1] | CATALYST ACTIVITY[2] | MI (g/10 min) | MIR[3] | BULK DENSITY[4] |
|---|---|---|---|---|---|
| 14 | $SiO_2$ + AMB + BzOCl + $TiCl_4$ + $HSiCl_3$ + TNHAL | 2960 | 2.7 | 23.7 | 0.41 |
| C6 | $SiO_2$ + AMB + BzOCL + $TiCl_4$ + $Cl_2$ + TNHAL | 1217 | 0.6 | 24.0 | 0.31 |
| 15 | $SiO_2$ + AMB + BzOCl + $HSiCl_4$ + $TiCl_4$ + TNHAL | 2752 | 2.3 | 25.6 | 0.41 |
| C7 | $SiO_2$ + AMB + BzOCl + $Cl_2$ + $TiCl_4$ + TNHAL | 909 | 0.7 | 28.8 | 0.33 |
| 1 | $SiO_2$ + $HSiCl_3$ + AMB + BzOCl + $TiCl_4$ + TNHAL | 2656 | 1.5 | 26.8 | 0.38 |
| C2 | $SiO_2$ + $Cl_2$ + AMB + BzOCl + $TiCl_4$ + TNHAL | 859 | 0.4 | 22.0 | 0.32 |
| 16 | $SiO_2$ + AMB + $HSiCl_3$ + BzOCl + $TiCl_4$ + TNHAL | 1825 | 1.3 | 25.7 | 0.40 |
| C8 | $SiO_2$ + AMB + $Cl_2$ + BzOCl + $TiCl_4$ + TNHAL | 1188 | 0.7 | 34.0 | 0.36 |
| C1 | $SiO_2$ + AMB + BzOCl + $TiCl_4$ + TNHAL | 462 | 1.0 | — | 0.40 |

[1]Reagent abbreviations are the same as Footnote 1 of Table a and B.
[2]See Footnote 2 of Table A.
[3]See Footnote 3 of Table A.
[4]See Footnote 4 of Table A.

TABLE D

| EXAMPLE NUMBER | ACTIVATOR USED | CATALYST (mg) | COCATALYST (mmol TEAL) | CATALYST ACTIVITY[1] | SPECIFIC ACTIVITY[2] | MI (g/10 min) | MIR[3] | DENSITY[4] |
|---|---|---|---|---|---|---|---|---|
| 17 | $HSiCl_3$ | 50 | 2.1 | 1785 | 4460 | 7.0 | 28.7 | 0.42 |
| 18 | $SiCl_4$ | 50 | 2.1 | 1964 | 4910 | 1.7 | 26.1 | 0.38 |
| 19 | $(CH_3)_2SiCl_2$ | 50 | 2.1 | 822 | 2055 | 1.2 | 27.5 | 0.37 |
| C9 | $t-C_4H_9Cl$ | 150 | 6.3 | 829 | 2072 | 1.5 | 25.7 | 0.37 |

TABLE D-continued

| EXAMPLE NUMBER | ACTIVATOR USED | CATALYST (mg) | COCATALYST (mmol TEAL) | CATALYST ACTIVITY[1] | SPECIFIC ACTIVITY[2] | MI (g/10 min) | MIR[3] | DENSITY[4] |
|---|---|---|---|---|---|---|---|---|
| C1 | None | 150 | 6.3 | 462 | 1155 | 1.0 | — | 0.40 |

[1] Units of catalyst activity are gPE/g catalyst component.
[2] Units of specific activity are g PE/g catalyst-hr-mole/L ethylene
[3] MIR is the ratio of HLMI to MI as measured by ASTM D1238 (condition E)
[4] Units of Bulk Density are cc/g

TABLE E

| EXAMPLE NUMBER | CATALYST (mg) | PE MAKE (g) | CATALYST ACTIVITY[1] | SPECIFIC ACTIVITY[2] | BULK DENSITY[3] |
|---|---|---|---|---|---|
| 20 | 50 | 94 | 1880 | 508.3 | 0.40 |
| C10 | 150 | 168 | 1120 | 242.3 | 0.35 |

[1] Units of catalyst activity are gPE/g catalyst component
[2] Units of specific activity are Kg PE/g titanium-hr-mole/L ethylene
[3] Units of Bulk Density are cc/g The polymerization results shown in Table A evidences that a catalyst component prepared without use of any chlorinating agent—Comparative Example C1—exhibits low activity. The activity of a catalyst component is improved by use of chlorine gas as a chlorinating agent—Comparative Example C2 but the improved activity results in the resin having a lower bulk density. In accordance with this invention, use of trichlorosilane to replace chlorine gas as the chlorinating agent dramatically enhances the activity of the catalyst component while maintaining a high bulk density for the produced resin—Example 1. Comparative Examples C3 and C4 establish the necessity of using an acyl halide in conjunction with the trichlorosilane to prepare catalyst components having enhanced activity Comparative Example C5 establishes the preference for utilizing an alkyl magnesium alkoxide rather than a dialkyl magnesium compound when preparing catalyst components in accordance with the invention.

Catalyst components prepared in accordance with the invention—Examples 1 and 11—provide substantial amounts of polyethylene resin using small charges of catalyst. In addition to high activity, the invention catalyst shows improved hydrogen sensitivity for the preparation of high bulk density resins with improved melt index.

Table B shows the performance of thirteen different catalyst components of the invention at differing reagent loadings. With catalyst components made in accordance with this invention there is the capability to design catalysts for the particular polymerization kinetics that are desired. For example, ethylene uptake measured for the catalyst of Example 12 showed a low initial rate, a low overall activity, and a slow rate of decay. The ethylene uptake measured for the catalyst of Example 13 was similar to 12 except for an increase in catalyst lifetime. A high initial rate, high overall activity, and a short catalyst lifetime was shown by the ethylene uptake measured for the catalyst formulation of Example 7 while a moderation of catalyst decay rate was shown in the ethylene uptake curve for the Example 4 catalyst A smooth transition in polymerization kinetics was shown by the ethylene uptake curves measured for the catalyst of Examples 13, 11 and 9 as the loading of Mg/g silica decreased.

The ability to control initial polymerization rate, overall polymerization activity and catalyst lifetime simply by changing catalyst reagent loadings, while maintaining high activities and resin bulk densities, is highly unusual and highly desirable.

Table C shows the effect on catalyst activity and resin bulk density based upon the sequence wherein the trichlorosilane or the chlorine gas chlorinating agent is used when preparing the catalyst component. In all cases the catalyst of the invention prepared with trichlorosilane—Examples 1 and 14–16—are superior in activity, hydrogen response and resin bulk density than are catalyst similarly prepared but wherein chlorine gas is used—Comparative Examples C2 and C6–C8.

Table D shows the use of different silicon halides in comparison to a catalyst prepared without the use of a silicon halide. In all cases the catalyst prepared with a silicon halide in accordance with the invention demonstrated superior activity and a comparable or enhanced resin bulk density The results of Table D further demonstrate the preference for using a tetrahalosilane or a trihalosilane for preparing catalysts of the invention. Organohalosilanes are less preferred, although still within the scope of this invention.

Table E demonstrates that production of the catalyst of the invention may be scaled-up to larger quantities without adversely affecting its productivity or bulk density properties.

The above results demonstrate the capability of the catalyst of the invention to provide a broad range of polymerization kinetics—such as initial rate, overall activity and catalyst lifetimes—by simple changes in the reagent ratios used during catalyst preparation. Deficiencies in the polymerization kinetics of the magnesium-transition metal containing supported catalyst heretofore known are thought to be the cause of inorganic gels (unreacted catalyst particles) and poor film appearance rating of resins produced with such catalyst. Such deficiencies are substantially reduced or eliminated in catalyst components made in accordance with this invention.

Although the invention has been described and illustrated in reference to its preferred embodiments, with this disclosure one skilled in the art may appreciate changes and modifications which may be made that do not depart from the scope and spirit of the invention as described above or claimed hereafter.

I claim:

1. An olefin polymerization catalyst component obtained by contacting in an inert hydrocarbon solvent a catalyst support material having a measured water content of less than 2 weight percent in any order of addition with (1) a halogenated silane compound of the formula $R_ySi_nX_{2n+2-y}$ wherein R is hydrogen or a hydrocarbyl group, X is a halogen, n is 1, 2, 3 or 5 and y is an integer of 0 to 2n;

(2) an alkoxy magnesium compound;
(3) an acyl halide; and
(4) a transition metal compound of a Group IVb, Vb, VIb or VIII metal.

2. The catalyst component of claim wherein the catalyst support material is silica.

3. The catalyst component of claim 2, wherein the halogenated silane compound is of the formula $H_ySiX_{4-y}$.

wherein y is 0 or 1.

4. The catalyst component of claim 2, wherein the halogenated silane compound is of the formula $H_ySiCl_{4-y}$ wherein y is 0 or 1, and the acyl halide is of the formula $R^3COX'$ wherein $R^3$ is an alkyl, aryl or alkyaryl group of from 1 to 20 carbon atoms and X' is a halogen.

5. The catalyst component of claim 4, wherein $R^3$ is an alkyl group having 1 to 6 carbon atoms, or a phenyl or alkylphenyl group having 6 to 10 carbon atoms and X' is chlorine.

6. The catalyst component of claim 4, wherein the transition metal compound is of the formula:

$MX''_{4-q}(OR^4)_q$ $MX''_{4-q}R^4q$ $VOX''_3$ or $VO(OR^4)_3$ wherein M is a transition metal, X" is a halogen, and $R^4$ is an alkyl, aryl, cycloalkyl, substituted aralkyl or 1,3-cyclopentadienyl group, and q is 0 or a number equal to or less than 4.

7. The catalyst component of claim 6, wherein M is titanium, vanadium or zirconium.

8. The catalyst component of claim 7, wherein the transition metal compound is $TiCl_4$.

9. The catalyst component of claim 6, wherein the alkoxy magnesium compound is of the formula $R^1_zMgOR^2_{2-z}$ wherein $R^1$ and $R^2$ are hydrocarbyl groups having from 1 to about 20 carbon atoms, and "z" is a real number equal to or greater than zero and less than 2.

10. The catalyst component of the claim 9, wherein the alkoxy magnesium compound is formed in situ by contacting the support material with a dialkyl magnesium compound and an alcohol.

11. The catalyst component of claim 9, wherein the silica support material is contacted with an amount of said alkoxy magnesium compound to provide from about 0.1 to about 5.0 mmole/g silica; acyl halide to provide from about 0.5 to about 2.0 moles per mole Mg;

halogenated silane compound to provide from about 0.5 to about 2.0 moles per mole Mg; and transition metal compound to provide from about 0.01 to about 1.5 mmol/g silica.

12. The catalyst component of claim 11, wherein following contact of the support material with the transition metal compound the support material is contacted with an organometallic compound of a Group IIa, IIb or IIIa metal.

13. The catalyst component of claim 12, wherein the organometallic compound is of the formula $R_m^5AlX'''_{3-m}$ wherein $1 \leq M \leq 3 R^5$ is a hydrocarbyl group having from 1 to 18 carbon atoms and X''' is halogen or hydride.

14. The catalyst component of claim 13, wherein the organometallic compound is contacted with the support material in an amount to provide from about 0.01 to about 15 mmol/g silica.

15. The catalyst component of claim 14, further comprising a free-flowing powder obtained upon removing the inert hydrocarbon solvent from said support material after contacting of the support material with the organometallic compound.

16. An olefin polymerization catalyst component obtained by contacting in an inert hydrocarbon solvent a caTALYST support material having a measured water content of less than 2 weight percent in any order of addition with (1) a halogenated silane compound of the formula $R_ySi_nX_{2n+2-y}$ wherein R is hydrogen or a hydrocarbyl group, X is a halogen, n is 1, 2, 3 or 5 and y is an integer of 0 to 2n;

(2) an alkoxy magnesium compound of the formula $\{R_z^1MgOR_2^2{}_z\}R_z^1Mg(OR^2)_{2-z}$;

(3) an acyl halide of the formula $\{H_ySiX_{4-y};$ and $\}R^3COX';$ and (4) a transition metal compound of a Group IVb, Vb, VIb or VIII metal of the formula $MX''_{4-q}(OR^4)_q$ $MX''_{4-q}R^4q$ $VOX''_3$ or $VO(OR^4)_3$ wherein $R^1$, $R^2$, $R^3$ and $R^4$ are hydrocarbyl groups having from 1 to 20 carbon atoms, M is said transition metal, $X^1$ and $X^{11}$ are halogen, $O \leq z < 2$ and q is 0 or a number equal to or less than 4.

17. The catalyst component of claim 16, wherein the catalyst support material is an inorganic oxide or a finely divided polyolefin.

18. The catalyst component of claim 17, wherein the halogenated silane compound is of the formula $H_ySiX_{4-y}$.

wherein y is 0 or 1.

19. The catalyst component of claim 17, wherein the halogenated silane compound is of the formula $$H_ySiCl_{4-y}$$

wherein y is 0 or 1, and wherein $R^3$ is an alkyl, aryl or alkyaryl group of from 1 to 20 carbon atoms.

20. The catalyst component of claim 19, wherein $R^3$ is an alkyl group having 1 to 6 carbon atoms, or a phenyl or alkylphenyl group having 6 to 10 carbon atoms and $X'$ is chlorine.

21. The catalyst component of claim 17, wherein M is titanium, vanadium or zirconium.

22. The catalyst component of claim 21, wherein the transition metal compound is $TiCl_4$.

23. The catalyst component of claim 9, wherein the silica support material is contacted with an amount of said
   alkoxy magnesium compound to provide from about 0 1 to about 5.0 mmole/g silica;
   acyl halide to provide from about 0.5 to about 2.0 moles per mole magnesium;
   halogenated silane compound to provide from about 0.5 to about 2.0 moles per mole magnesium; and
   transition metal compound to provide from about 0.01 to about 1.5 mmol/g silica.

24. The catalyst component of claim 23, wherein following contact of the support material with the transition metal compound the support material is contacted with an organometallic compound of a Group IIa, IIb or IIIa metal in an amount to provide from about 0.01 to about 15 mmol/g silica.

25. The catalyst component of claim 24, wherein the organometallic compound is of the formula $$1 \leq M \leq 3 R_m^5 AlX'''_{3-m}$$

wherein $R^5$ is a hydrocarbyl group having from 1 to 18 carbon atoms and $X'''$ is halogen or hydride.

26. The catalyst component of claim 24, further comprising a free-flowing powder obtained upon removing the inert hydrocarbon solvent from said support material after contacting of the support material with the organometallic compound.

* * * * *